INVENTORS
DAVID W. DANIEL
ZENON KOKORZYCKI
BY *Whittemore,*
*Hulbert, Belknap*
ATTORNEYS

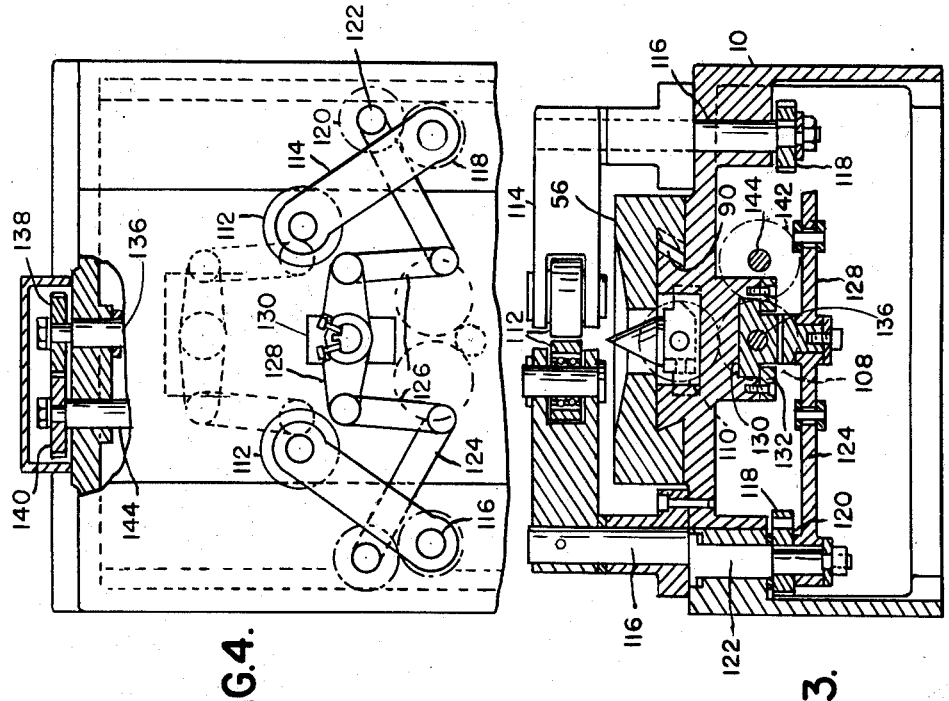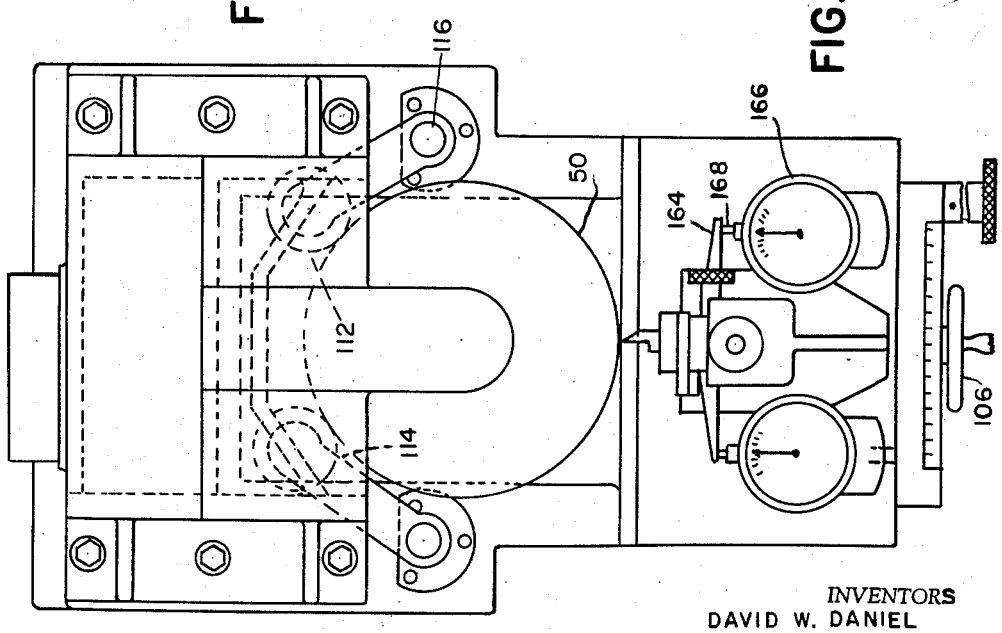

Jan. 8, 1963  D. W. DANIEL ETAL  3,071,862
INVOLUTE CHECKER
Filed June 23, 1958  4 Sheets-Sheet 3
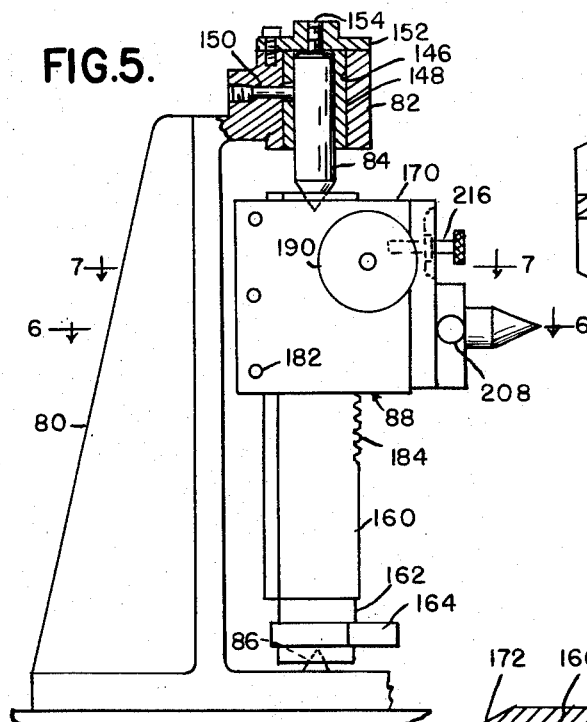
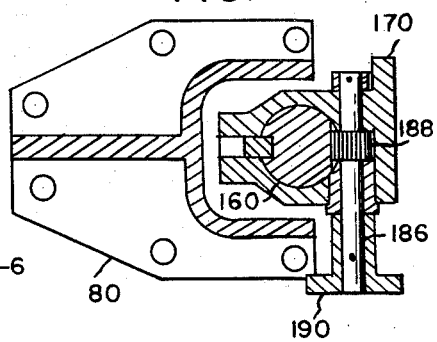
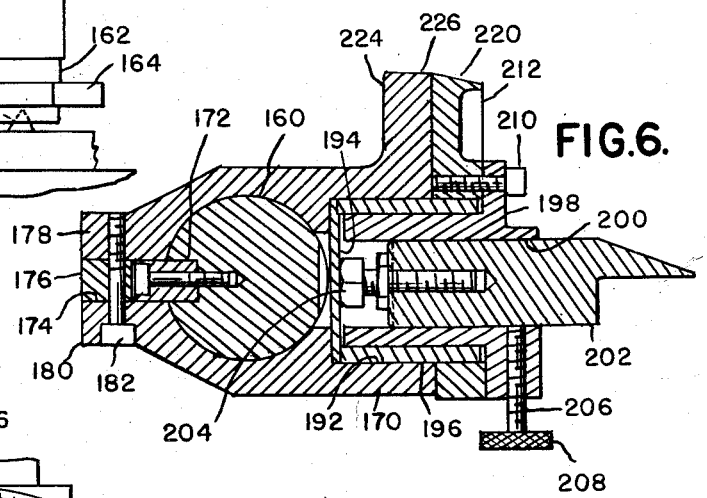
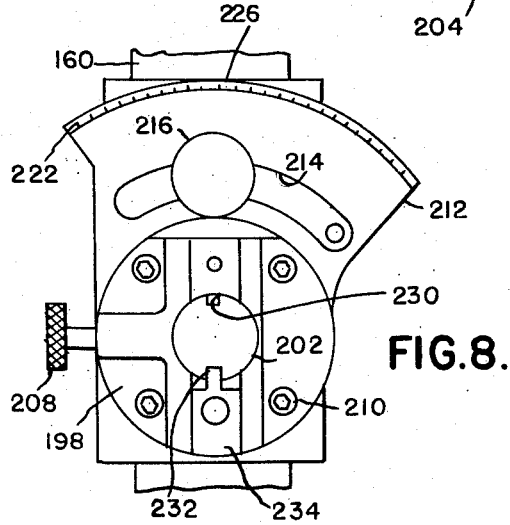
INVENTORS
DAVID W. DANIEL
ZENON KOKORZYCKI
BY
ATTORNEYS

INVENTORS
DAVID W. DANIEL
BY ZENON KOKORZYCKI
ATTORNEYS

United States Patent Office 3,071,862
Patented Jan. 8, 1963

3,071,862
INVOLUTE CHECKER
David W. Daniel and Zenon Kokorzycki, Detroit, Mich., assignors to National Broach & Machine Company, Detroit, Mich., a corporation of Michigan
Filed June 23, 1958, Ser. No. 743,884
5 Claims. (Cl. 33—179.5)

The present invention relates to an involute checker characterized by structural arrangements contributed to extreme accuracy and minimizing errors inherent in presently known constructions.

More specifically, it is an object of the present invention to provide an involute checker in which the work gear to be checked is supported on a spindle between dead centers and the base roll is rigidly secured to and becomes a part of the work supporting spindle.

It is a feature of the present invention to provide an involute checker in which the base roll which is engaged at one side by a straight edge, is engaged at two points spaced roughly 120 degrees therefrom by counterbalancing rollers so that the base roll is moved while under balanced stresses.

Other objects and features of the invention will become apparent as the description proceeds, especially when taken in conjunction with the accompanying drawings, illustrating preferred embodiments of the invention, wherein:

FIGURE 2 is a plan view of the structure shown in FIGURE 1.

FIGURE 3 is a vertical sectional view illustrating principally the mechanism for balancing stresses on the base roll.

FIGURE 4 is a fragmentary plan view showing connections to the base roll balancing rollers.

FIGURE 5 is an enlarged elevational view of the gear contacting pointer and support structure therefor.

FIGURE 6 is an enlarged fragmentary sectional view on the line 6—6, FIGURE 5.

FIGURE 7 is a fragmentary sectional view on the line 7—7, FIGURE 5.

FIGURE 8 is a fragmentary front elevational view of the gear finger support structure.

Figure 1:
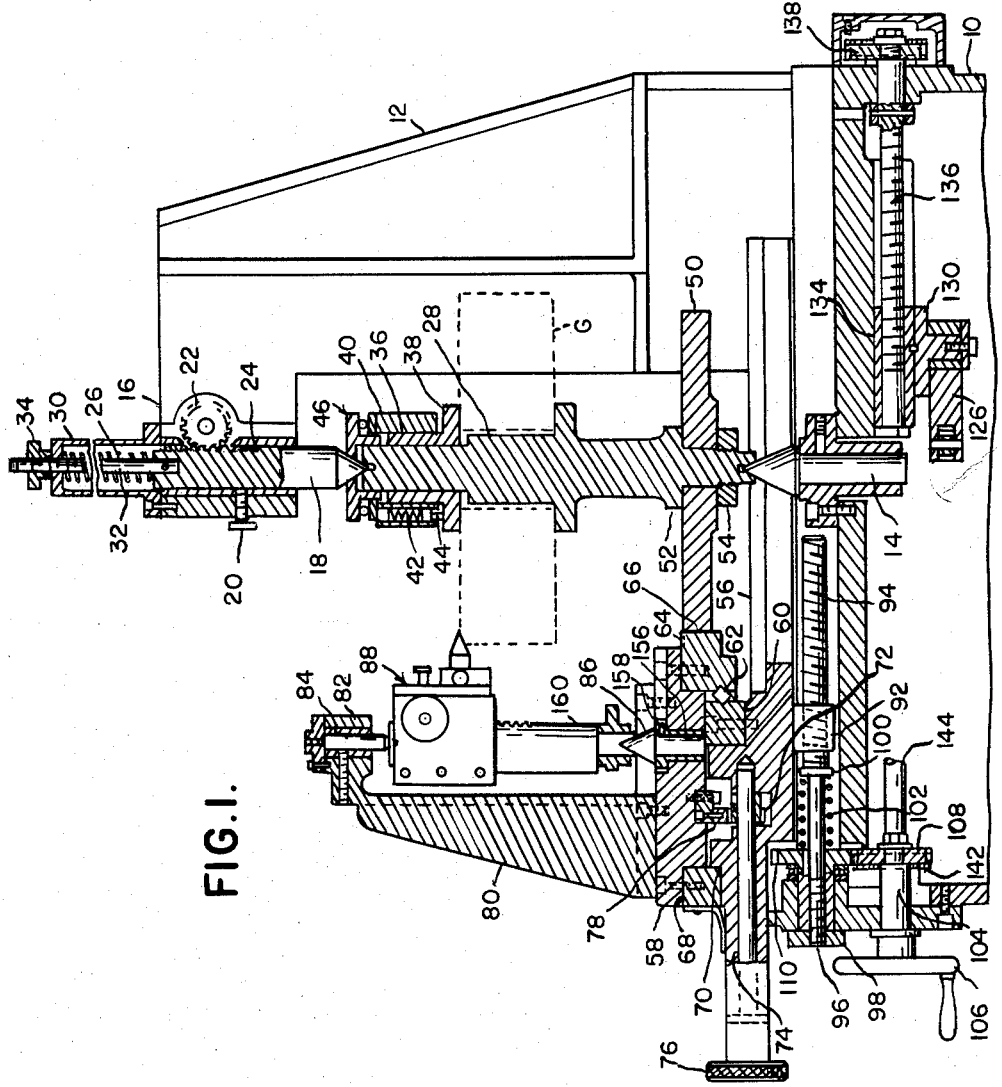
FIGURE 1 is a side elevational view of the checker with parts broken away to different vertical planes to show the internal mechanism.
Figure 9:
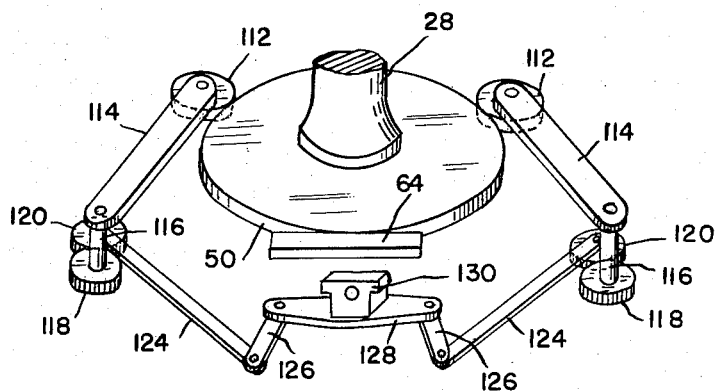
FIGURE 9 is a diagrammatic perspective view showing the relationship between the base roll, sine bar, and balance rolls.
Figure 10:
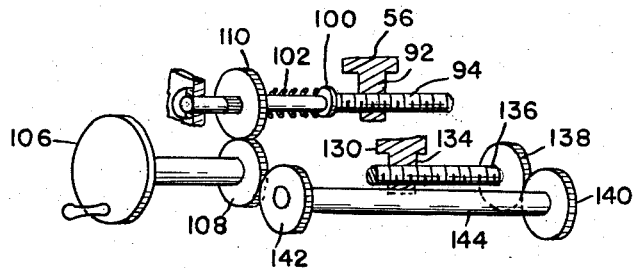
FIGURE 10 is a fragmentary diagrammatic perspective view showing the actuating mechanism for the sine bar and balance roll mechanism.

Referring first to FIGURES 1-4, the involute checker comprises a rigid support base 10 having a column 12 fixedly secured thereto. Mounted in the base 10 is a dead center 14 and the upper end of the column 12 includes a laterally extending portion 16 in which is vertically mounted a dead center 18 adapted to be locked in place by a set screw 20 and which center may be vertically adjusted by a pinion 22 in association with rack teeth 24 carried by or connected to the dead center 18. The dead center 18 is urged downwardly by a compression spring 26. When the set screw 20 is loosened the dead center 18 may be elevated against the spring 26 by rotating the pinion 22 with a suitable hand wheel to retract the center from the upper end of the work supporting arbor 28. When a new gear has been placed upon the arbor and it is desired to reposition the arbor between the dead centers 14 and 18, the spring 26 urges the dead center 18 downwardly with a predetermined force so that prior to locking up the set screw 20, the arbor is spring loaded between centers. Extending upwardly through an opening in the cap 30 and attached to center 18 is a rod 32 the upper end of which is threaded and which receives a nut 34 which constitutes means limiting downward movement of the dead center 18. In use of course when the dead center is engaged with the arbor 28 the nut is spaced above the top of the cap 30.

At its upper end the arbor is provided with an assembly comprising a sleeve 36 slidable over the reduced upper end of the arbor, the sleeve having a laterally extending flange 38 engageable with the top of a gear G to be checked. Surrounding and slidable axially on the sleeve 36 is a hollow tubular casing 40 having a plurality of compression springs 42 therein engageable with the heads of pins 44 which extend through openings at the lower end of the casing and engage the upper surface of the flange 38. At the upper end the casing 40 carries a bearing indicated generally at 46, the upper element of which is thus urged by the spring means 42 against the conical point of the dead center 18. In use element 18 engages element 46 and then presses it down until the pointed end of the center engages the recess at the end of the arbor 28.

The involute checking operation is carried out by effecting rotation of the spindle or arbor 28 by means of a base roll and by causing a pointer to move across the surface of a tooth of the gear. If the surface of the tooth is a true involute, the pointer, carried by a carriage including a straight edge movable in driving relation to the base roll, will not move. Movement of the pointer is used through suitable multiplying mechanism to actuate a conventional indicator or to actuate other control or indicating or recording devices are required.

As best seen in FIGURE 1, the arbor 28 is provided with a base roll 50 the outer surface of which is an accurately finished cylindrical surface exactly concentric with the opening in the base roll. The base roll is rigidly clamped against a flange 52 on the arbor by a nut 54 and thus in effect becomes a rigid integral part thereof.

Mounted on a main slide 56, which will subsequently be described, is a cross slide 58 the cross slide being guided on a rail 60 bolted or otherwise secured to the main slide 56 through the medium of roller bearings 62 and a rail or sine bar 64 which is bolted or otherwise secured to the cross slide 58. The sine bar 64 includes an accurately finished flat surface 66 which engages the periphery of the base roll in frictional engagement and drives it in rotation. At the opposite side, the cross slide includes a rail 68 guidingly received in a seat 70 formed in the main slide. Transverse movement of the cross slide 58 is effected by a pinion 72 secured to a shaft 74 adapted to be rotated by a knurled wheel 76, the pinion being in mesh with a rack 78 bolted or otherwise secured to the cross slide 58. The shaft 74 is journaled in the main slide 60 and rotation thereof will effect movement of the cross slide 58 on the main slide 56.

Mounted on the cross slide 58 is a pedestal 80 provided at its upper end with a lateral extension 82 in which is received a centering pin 84. Details of this construction will be described more fully hereinafter. Supported between the centering pin 84 and a lower centering pin 86 carried directly by the cross slide 58 is movable gear tooth contacting mechanism 88.

In checking involutes having different base circles it is of course necessary to provide base rolls having diameters equal to the base circles of the involutes to be checked. This means that for checking gears of different size it is necessary to move the main slide 56 and the cross slide 58 carried thereby, generally radially toward and away from the dead centers 14 and 18. This is accomplished by supporting the main slide 56 on ways 90 on the base 10 in the manner best illustrated in FIGURE 3. In order to effect adjustment of the main slide 56 it is provided with a depending threaded nut portion or lug 92 engaged by a feed screw 94 connected to a shaft 96 having a head 98 connected thereto and constituting an abutment bearing against an outer surface of the base 10. The shaft 96 extends through an opening in the base and is provided with a flange 100 constituting a spring seat engageable by a spring 102. With this construction rotation of the feed screw 94 results in horizontal movement of the main slide 56, to the right or left as seen in FIGURE 1. However, if this movement is interrupted by engagement for example between the surface 66 of the sine bar 64 and the base roll 50, then continued rotation of the shaft 96 merely compresses the spring 102, thereby preventing damage to the base roll. In other words, the pressure between the sine bar 64 and the base roll 50 is limited by the strength of the spring 102.

In order to effect rotation of the feed screw 94 to move the main slide 56 in and out relative to the work supporting arbor, there is provided a stub shaft 104 to the outer end of which is connected a hand wheel 106, and which at its inner end carries a gear 108. The gear 108 is in mesh with a gear 110 splined to and axially slidable on the shaft 96 so as to drive the shaft 96 and feed screw 94 in rotation while permitting movement of the shaft and feed screw to the left under conditions outlined above.

Means are also provided for counterbalancing the force applied to the base roll by the sine bar. It will be appreciated that in checking the involute surfaces of gears with a maximum degree of accuracy, any deflection of any of the parts must be avoided. In the present case the arbor to which the base roll is rigidly attached as an effectively integral part is supported for rotation at a fixed location on the base 10. If now the sine bar 64 were urged against the base roll 50 with sufficient pressure to establish a frictional driving relation between the base roll and sine bar, then this force would inherently induce errors even though the arbor 28 was supported without any determinable looseness or backlash between the dead centers. An unbalanced force applied to the arbor will produce deflection thereof in some degree.

In accordance with the present invention the force applied in one direction to the base roll 50 is counterbalanced by forces applied through rollers spaced 120 degrees from the point of contact between the base roll and sine bar. This mechanism is best illustrated in FIGURES 1–4 where the counterbalance rollers are shown at 112 carried by arms 114 extending radially from shafts 116 to the lower ends of which are keyed or otherwise secured gears 118. The gears 118, as best seen in FIGURE 4, are in mesh with gears 120 keyed or otherwise secured to shafts 122 from which extend actuating arms 124 connected by links 126 to an equalizer bar 128 pivotally mounted on a slide 130 which in turn is slidably mounted on the base 10 and retained thereon by removable strips 132. The slide 130 includes a nut 134 engaged on a feed screw 136 connected to a gear 138 which as best seen in FIGURE 4 is in mesh with a gear 140. The gear 140 is in alignment with a gear 142 at the front of the base which is in mesh with the gear 108 previously described. The gear 142 is directly connected to the gear 140 by a shaft 144.

With this arrangement of parts rotation of the hand wheel 106 operates through the gears 108 and 110 to drive the feed screw 94, which upon proper rotation of the hand wheel moves the main slide 56 rearwardly to cause the driving surface 66 of the sine bar 64 to approach the peripheral edge of the base roll 50. At the same time, rotation of the hand wheel through the gears 108 and 142, the shaft 144, and the gears 140 and 138, results in rotation of the feed screw 136 and movement of the slide 130 forwardly, carrying the equalizer bar which through the links 126 and the arms 124 results in a corresponding rotation of the gears 120. This in turn drives the gears 118 which results in swinging movement of the arms 114 and the rollers 112 carried thereby to cause the rollers to approach the peripheral surface of the base roll. The location of the shafts 116 to which the arms 114 are secured, the lengths of the arms 114, the lengths of the arms of the equalizer bar 128, the links 126, and the arms 124, are all carefully selected so that as nearly as possible the rollers 112 will come into engagement with the periphery of the base roll just after contact is established between the sine bar 64 and the base roll. This means that for the support rollers 112 to move into actual engagement with the base roll, some compression of the spring 102 from its illustrated position is required. This in turn results in the establishment of a pressure between the base roll and sine bar which is determined by the strength of the spring 102, and the counterbalancing force applied by the support rollers 112 is developed by rotation of the hand wheel 106.

With the foregoing arrangement it will be appreciated that the work gear G is supported in a fixed location and is rotated in this location by the application of forces which are balanced so as to cancel out any lateral stress applied to the arbor or spindle 28. Since the spindle is accurately supported on stationary dead centers this permits rotation of the gear without appreciable errors attributable to the mechanism for supporting and driving the gear.

Referring now to FIGURES 5–8 there is illustrated in some detail the mechanism engageable with a surface of a gear tooth for actually measuring its involute profile. The pedestal 80 as previously described, includes the lateral extension 82 which carries the upper dead center 84 providing support for the gear contacting mechanism indicated generally at 88. More specifically, the extension 82 includes the cylindrical through opening 146 which receives a bushing 148 provided with a lateral opening through which extends a set screw 150. A removable cap 152 is provided on the extension 82 and carries an adjustable abutment screw 154 so that the location of the center 84 may be adjusted to compensate for wear. The gear contacting mechanism 88, as previously described, is supported on a lower dead center 86, this also being received in a bushing 156 and retained therein by a set screw 158.

Mounted directly between the centers 84 and 86 is a shaft 160 which at its lower end is provided with an indicator device 162 including a pair of indicator actuator arms 164, best seen in FIGURE 2. The involute checker includes a pair of conventional dial indicators indicated at 166 provided with movable plungers 168 one of which is adapted to be actuated by the corresponding actuating arm 164 depending upon which side of a gear tooth is being checked. Vertically movable on the shaft 160 in accurately guided relation is a housing 170. As best seen in FIGURE 6, the shaft 160 is slotted to receive an accurately ground key 172. The housing 170 is slotted as indicated at 174 and receives a spacer 176 which may be accurately ground to the same transverse dimension as the key 172. Thereafter, the portions 178 and 180 of the housing 170 at opposite sides of the spacer 176 are brought into clamping engagement against the sides of the spacer by the clamping screws 182. Thus, all backlash between the key 172 and the housing 170 is eliminated.

To provide for vertical movement of the housing 170 on the shaft 160, rack teeth 184 are formed at one side of the shaft 160 and the housing 170 is provided with a transverse shaft 186 having an actuating pinion 188 therein in mesh with the rack teeth 184. The shaft 186 has a knurled knob 190 by means of which the pinion may be rotated, thus effecting vertical movement of the housing 170 on the shaft or spindle 160.

At its side adjacent the gear to be checked the housing 170 is recessed as indicated at 192, a bottom plate 194 being provided in the recess. Also located in the recess is a hardened bushing 196. Rotatably received within the bushing is a generally cylindrical sleeve 198 having a cylindrical recess 200 therein which receives the gear engaging contact element 202. The contact element 202 carries an adjustable abutment screw 204 at its inner end engageable with the plate 194 to predetermine the amount which the contact element extends outwardly from the housing 170. The contact element is clamped in position by a set screw 206 provided with a knurled actuating knob 208. Connected to the sleeve 198 as by the screw 210 is a clamping and indicating device 212. This device, as best seen in FIGURE 8, is provided with an elongated arcuate slot 214 through which extends a clamping screw 216 (see FIGURE 5), the screw extending into the housing 170. When the screw 216 is loosened, the sleeve 198 carrying the contact element 202 and the indicating and clamping device 212 may rotate about the axis of the recess 192 in order to position the contact element 202 for proper engagement with a helical gear tooth. For ready adjustment of the contact element support structure, the device 212 may be provided with graduations on the surface 220, these graduations being indicated at 222 in FIGURE 8. An appropriate pointer may be provided on the flange 224 of the housing 170 at the point indicated at 226 to facilitate reading the setting of the contact element.

In order to facilitate a changeover in checking one side and the other of gear teeth, the contact element 202 is provided with recesses 230 at opposite sides thereof, one or the other of which is engaged by a finger 232 of a removable block 234. In order to reverse the contact element for use at the opposite side of a gear tooth it is only necessary to release clamping screw 208, withdraw the block 234, and rotate the contact element 180 degrees, after which the block 234 is re-inserted with its finger 232 in the opposite recess 230.

Due to the refinements introduced into the production of the present involute checker it is possible to measure involute surfaces with an accuracy not hitherto attainable. The apparatus not only eliminates bearing surfaces which may be a source of backlash, but also provides for a counterbalance of applied forces which eliminate strain in the support structure. Strain due to stresses applied in devices of this sort is of course not large but the instrument is designed for such accurate measurements that even the amount of strain which has been negligible in prior constructions is eliminated.

The drawings and the foregoing specification constitute a description of the improved involute checker in such full, clear, concise and exact terms as to enable any person skilled in the art to practice the invention, the scope of which is indicated by the appended claims.

What we claim as our invention is:

1. In a gear checking machine comprising a base, a base roll, means mounting said base roll for rotation in a fixed position on said base, a main slide movable on said base toward and away from said base roll, a cross slide on said main slide movable thereon transversely of said base roll, said cross slide having a plane roll drive surface thereon, an actuator for moving said main slide toward and away from said base roll, said actuator comprising a feed screw and nut assembly, and resilient means connecting said assembly between said base and said main slide, balance mechanism on said base engageable with the side of said base roll opposite said cross slide, said balance mechanism including base roll engaging means movable toward and away from said base roll, and connections between said actuator and said balance mechanism effective to move said roll engaging means toward and away from said base roll as said main slide is moved toward and away from said base roll, said balance mechanism comprising a balance slide movable on said base, a pair of arms pivoted to said base, said roll engaging means comprising rollers on said arms, and actuating connections between said balance slide and said arms, said actuating connections comprising a pivoted equalizer bar on said balance slide and connections between said bar and both of said arms to swing said arms upon movement of said balance slide.

2. Structure as defined in claim 1 in which the connections between said bar and both of said arms include links connected to said balance arms, and means connecting each of said links to one of said arms.

3. In a gear checking machine comprising a base, a base roll, means mounting said base roll for rotation in a fixed position on said base, a main slide movable on said base toward and away from said base roll, a cross slide on said main slide movable thereon transversely of said base roll, said cross slide having a plane roll drive surface thereon, an actuator for moving said main slide toward and away from said base roll, said actuator comprising a feed screw and nut assembly, and resilient means connecting said assembly between said base and said main slide, balance mechanism engageable with the side of said base roll opposite said cross slide, said balance mechanism including base roll engaging means movable toward and away from said base roll, and connections between said actuator and said balance mechanism effective to move said roll engaging means toward and away from said base roll as said main slide is moved toward and away from said base roll, said balance mechanism comprising a balance slide movable on said base, a pair of arms pivoted to said base, said roll engaging means comprising a roller on each of said arms, and actuating connections between said balance slide and said arms to swing said arms by movement of said slide, the connections between said actuator and said balance slide comprising a feed screw and nut assembly connected between said base and said balance slide, the yielding of said resilient means providing for engagement between said base roll and said drive surface and both of said rollers.

4. An involute checker comprising a base, mounting means on said base for mounting a work gear for rotation in a fixed position, said mounting means comprising a rotatable base roll, a slide movable on said base toward and away from said mounting means, a plane rail member on said slide engageable with said base roll, means on said slide connected to said rail member for moving said rail member longitudinally to impart rotation to said base roll, balance roll mechanism on said base including a balance roll member movable into engagement with said base roll in opposition to said rail, a single actuator operatively connected to said slide and to said balance mechanism, to effect simultaneous movement thereof toward said base roll, said rail member and base roll member being relatively positioned such that one of said members engages said base roll in advance of the other, and yieldable means in the operative connection between said actuator and said first one member to provide for continued movement of said other member into engagement with said base roll after said one member has engaged said base roll.

5. A checker as defined in claim 4 in which said balance mechanism comprises a pair of arms pivoted to said base, a balance roll on each of said arms, and in which the operative connection between said actuator and said balance mechanism comprises an equalizing means to apply equal torque to said arms.

References Cited in the file of this patent

UNITED STATES PATENTS

| 1,680,563 | Miller | Aug. 14, 1928 |
| 2,026,649 | Olson | Jan. 7, 1936 |
| 2,063,474 | Try | Dec. 8, 1936 |
| 2,087,957 | Pelphrey | July 27, 1937 |
| 2,895,227 | Wagner | July 21, 1959 |